(12) United States Patent
Schlipf et al.

(10) Patent No.: US 12,434,810 B2
(45) Date of Patent: Oct. 7, 2025

(54) SEALING DEVICE FOR COVERING AN APERTURE IN A WING PART

(71) Applicant: Airbus Operations GmbH, Hamburg (DE)

(72) Inventors: Bernhard Schlipf, Hamburg (DE); Dennis Krey, Hamburg (DE); Atra Surya Gemilang, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 59 days.

(21) Appl. No.: 18/333,947

(22) Filed: Jun. 13, 2023

(65) Prior Publication Data

US 2023/0406480 A1 Dec. 21, 2023

(30) Foreign Application Priority Data

Jun. 15, 2022 (EP) .................................... 22179330

(51) Int. Cl.
*B64C 9/02* (2006.01)
(52) U.S. Cl.
CPC ..................................... *B64C 9/02* (2013.01)
(58) Field of Classification Search
CPC ....... B64C 9/02; B64C 2009/143; B64C 7/00; B64C 3/18
See application file for complete search history.

(56) References Cited

U.S. PATENT DOCUMENTS

| | | | |
|---|---|---|---|
| 4,687,162 A | 8/1987 | Johnson et al. | |
| 7,051,982 B1 * | 5/2006 | Johnson | B64C 9/02 244/129.1 |
| 2009/0065297 A1 | 3/2009 | Hein et al. | |
| 2012/0325976 A1 * | 12/2012 | Parker | B64C 9/22 244/203 |
| 2013/0126670 A1 * | 5/2013 | Vaghela | B64C 9/22 244/99.3 |

(Continued)

FOREIGN PATENT DOCUMENTS

| | | |
|---|---|---|
| EP | 2960157 A1 | 12/2015 |
| WO | 2005016748 A2 | 2/2005 |

(Continued)

OTHER PUBLICATIONS

European Search Report for corresponding European Patent Application No. 22179330 dated Nov. 21, 2022; priority document.

*Primary Examiner* — William L Gmoser
(74) *Attorney, Agent, or Firm* — Greer, Burns & Crain, Ltd.

(57) ABSTRACT

A sealing device for covering an aperture in a wing part of an aircraft. The sealing device has a cover plate covering at least a part of the aperture and having an outer surface delimited by a cover plate edge, and at least one holding device coupled with the cover plate. The at least one holding device having a resilient element, the at least one holding device resiliently holds the cover plate in a distance to an actuation element. The distance is variable in a first direction substantially perpendicular to the outer surface. The at least one holding device holds the cover plate in a substantially fixed spatial alignment in a second direction perpendicular to the first direction. The resilient element urges the cover plate towards the actuation element in a mounted state of the sealing device.

15 Claims, 5 Drawing Sheets

(56) References Cited

U.S. PATENT DOCUMENTS

| | | | |
|---|---|---|---|
| 2013/0214096 A1* | 8/2013 | Wilson | B64C 3/50 |
| | | | 277/642 |
| 2015/0353187 A1* | 12/2015 | Smith | B64C 9/34 |
| | | | 244/214 |
| 2015/0375848 A1* | 12/2015 | Lucas | B64C 7/00 |
| | | | 244/1 N |
| 2016/0096615 A1 | 4/2016 | Wilson et al. | |
| 2017/0167610 A1* | 6/2017 | Blades | F16J 15/021 |
| 2018/0023618 A1* | 1/2018 | Galeotti | F16C 11/12 |
| | | | 244/214 |
| 2018/0327080 A1 | 11/2018 | Lucas et al. | |
| 2019/0176959 A1* | 6/2019 | Poloni | B64D 15/04 |
| 2020/0307760 A1* | 10/2020 | de Queiroz | B64C 9/22 |
| 2021/0024198 A1* | 1/2021 | Lorenz | B64C 9/02 |
| 2021/0403140 A1* | 12/2021 | Peterson | B64C 7/00 |
| 2022/0055734 A1 | 2/2022 | Poloni et al. | |
| 2024/0174346 A1* | 5/2024 | Schlipf | B64C 9/16 |

FOREIGN PATENT DOCUMENTS

| | | | |
|---|---|---|---|
| WO | 2012063046 A1 | 5/2012 | |
| WO | 2017216691 A1 | 12/2017 | |

\* cited by examiner

SEALING DEVICE FOR COVERING AN APERTURE IN A WING PART

CROSS-REFERENCES TO RELATED APPLICATIONS

This application claims the benefit of European Patent Application No. 22179330.0 filed on Jun. 15, 2022, the entire disclosure of which is incorporated herein by way of reference.

FIELD OF THE INVENTION

The invention relates to a sealing device for covering an aperture in a wing part of an aircraft, a wing of an aircraft as well as an aircraft having such a wing and/or at least one sealing device.

BACKGROUND OF THE INVENTION

Commercial or transport aircraft having fixed wings are usually equipped with high lift systems that comprise deployable high lift devices for selectively increasing the wing surface and the camber for start and landing procedures. These high lift devices often comprise leading-edge and trailing-edge devices. For example, a slat is arranged at a leading edge of the wing and is movable from a retracted position, in which the slat is flush with a fixed wing part, into a forward and/or downward direction through an actuation mechanism. In extended positions, the slat often creates a gap between itself and the fixed wing part.

The actuation mechanism is mainly located inside the fixed wing part and may comprise two curved support tracks or linkages per slat that are spaced apart in a spanwise direction and coupled with the slat through lugs, knuckles, joints, or other coupling devices. The fixed wing part comprises apertures, into which the coupling devices reach when the slat is retraced, and through which the support tracks or linkages reach during an extension of the slat. Some of the apertures are placed at a lower surface of the fixed wing part and are covered during in cruise flight, where the respective cover is exposed to a continuous air flow. Hence, the cover influences the aerodynamic behavior of the wing if it is not arranged inside the aperture to be completely flush with the surrounding parts of the fixed wing part.

Sealing devices for closing apertures are known. For example, for apertures in an upper side of a fixed wing part, WO 2012/063046 A1 proposed a seal assembly comprising a track for attachment to the structure, and a retractable seal including a flexible substrate and a plurality of rods connected to the substrate, wherein at least one of the rods is mounted for running movement along the track, and the seal is moveable between an extended position and a retracted position by moving the at least one rod along the track accompanied by folding/unfolding of the seal substrate, and wherein the seal is biased to its extended position.

Sealing devices for covering at least a part of an aperture at a lower side of a fixed wing part often comprise cover plates that are attached to a support track for moving a leading-edge device, wherein the cover plates are adjusted in their attachment position through fastening elements. They follow deformation-induced motion of the respective support track and may extend into the air flow also during cruise flight with retracted leading-edge devices.

SUMMARY OF THE INVENTION

It is an object of the invention to propose an alternative sealing device for covering an aperture of a wing part of an aircraft at least partially, in particular on a lower side of a fixed wing part, wherein the sealing device should be mechanically simple, reliable, substantially maintenance-free and has a low weight.

This object is met by a sealing device having the features of one or more embodiments described herein. Advantageous embodiments and further improvements may be gathered from the following description.

A sealing device for covering an aperture in a wing part of an aircraft is proposed, the sealing device comprising a cover plate for covering at least a part of the aperture, the cover plate having an outer surface delimited by a cover plate edge, and at least one holding device coupled with the cover plate, wherein the at least one holding device comprises a resilient element, wherein the at least one holding device is designed for resiliently holding the cover plate in a distance to an actuation element, wherein the distance is variable in a first direction substantially perpendicular to the outer surface, wherein the at least one holding device is designed for holding the cover plate in a substantially fixed spatial alignment in second directions perpendicular to the first direction, and wherein the resilient element is designed for urging the cover plate towards the actuation element in a mounted state of the sealing device.

The sealing device according to the invention thus mainly consists of two components, i.e. the cover plate and the holding device. They are attached together and are placeable at the wing part at a respective aperture for covering at least a part of it as explained in the following. The actuation element may be a track or a lever that reaches through the aperture to move a control surface coupled to the wing part. The wing part may be a fixed wing part of a wing, with which control surfaces are coupled. Preferably, the respective aperture is on a lower side of the wing part and remains outside a respective movable control surface in its retracted state, such that it is preferably covered by the cover plate in a clean wing condition.

The cover plate serves for closing at least a part of the respective aperture. Preferably, the cover plate is designed to cover at least a part of the aperture that is exposed to the air flow when the respective control surface is retracted. This is achieved through providing the outer surface that has a shape which conforms the shape of the respective part of the aperture. The cover plate edge and thus the contour of the outer surface, substantially corresponds to an aperture contour in a way that the cover plate can be placed directly inside the aperture to create a substantially continuous, substantially closed surface with the adjacent regions of an outer surface of the wing part. The cover plate may be made from a metallic material, such as aluminum, or a plastic material, which may also comprise reinforcement fibers.

The outer surface of the cover plate preferably is a closed and continuous surface that will be placed inside the aperture to face outwards, i.e. to a side where the air flow is to be expected in flight. It is further preferred that the outer surface of the cover plate and the outer aperture contour, i.e. the aperture contour at an outer side of the wing part, enclose a small circumferential gap that allows a slight lateral position compensation between the cover plate and the aperture. However, as mentioned further below, the inner aperture contour, i.e. the aperture contour at an inner side of the wing part, may in some embodiments be smaller than the contour of the outer surface, such that the cover plate is not pulled through the aperture completely into the wing part. As an alternative or additional thereto, an end stop at an inner side of the aperture may be provided, into which the cover plate rests in a retracted state of the actuation element.

The at least one holding device is provided for holding the cover plate on the actuation element in a way that the cover plate has a variable distance to the actuation element. In other words, the cover plate may move in a direction perpendicular to the outer surface to increase or decrease the distance to the actuation element. Thus, the cover plate is able to remain attached to the actuation element and rest inside the aperture edge even if the actuation element elastically deforms during flight. The cover plate may thus remain in the respective aperture but is not urged out of the aperture during elastic deformations.

The holding device may thus be capable of providing a substantially telescopic motion. The resilient element may be provided for urging the cover plate in an inward direction when the sealing device according to the invention is mounted to a wing of an aircraft. In other words, the resilient element is designed for continuously pulling the cover plate towards the actuation element, which is arranged inside the wing. It may be provided in the form of a spring.

The substantially fixed lateral position of the cover plate, i.e. perpendicular to the above-identified first direction, is to be understood that only minor, slight movements of the cover plate in lateral directions are possible. These are mainly required for compensation of elastic deformations or temperature-induced expansion or contraction motions. The slight movement in lateral directions may already be provided through mechanical play and deformation.

It is preferred that the aperture and the cover plate are designed to let the cover plate align with the aperture automatically. This may be achieved through a suitable design of the cover plate edge and the aperture edge.

The sealing device according to the invention thus provides a simple and effective device for covering an aperture, in particular on the lower surface of the fixed wing part, to provide a continuous and flush surface with excellent aerodynamic characteristics, wherein a damage of the cover caused by elastic bending motion of the wing part structure is prevented.

In an advantageous embodiment, the cover plate edge is at least partially chamfered to align the cover plate in a complementary shaped delimiting edge of the aperture when the cover plate is placed in the aperture. The cover plate edge is chamfered, such that a self-alignment function is achieved. It is preferred that the outer surface contour is chamfered inwardly by designing the inner surface of the cover plate to be smaller than its outer surface. In a cross-section of the cover plate on a plane substantially perpendicular to the cover plate, the chamfered edge may extend along a straight line between the outer surface contour to the inner surface contour at least in a section. In consequence, the aperture edge may as well be chamfered to let the cover plate edge align in the complementary edge automatically. By continuously urging the cover plate inwards, the chamfered cover plate edge remains in contact with the aperture edge or the edge of a part adjacent to the aperture edge in the retracted state of the control surface, substantially independently from the position of the actuation element relative to the respective aperture. If an annular insert is placed into the aperture or if an aligning bracket (see further below) is provided at an inner side of the wing part at the aperture, the aperture edge may also include edges of the respective insert or aligning bracket if in direct contact with the cover plate.

In an advantageous embodiment, the at least one holding device comprises at least two and preferably at least three holding devices. By providing a plurality of holding devices, the cover plate is smoothly supported on the actuation element and constraint forces and inclined positions that occur during a relative motion between the cover plate and the actuation element may be prevented. It is preferred to distribute the plurality of holding devices symmetrically on the inner side of the cover plate.

In an advantageous embodiment, the at least one holding device comprises a guide element with a first end and an opposite second end, wherein the first end is attached to the cover plate, and wherein the resilient element is arranged on the guide element and contacts a shoulder arranged on the second end. The guide rod may protrude through a through-hole of a flange, a mounting device, or a bracket that is attached to the actuation element. The first end of the guide rod is preferably fixedly attached to an inner side of the cover plate, such that the cover plate cannot move relative to the first end. The resilient element may be designed to enclose the guide rod. It may exemplarily be a compression spring, which is arranged between the above-mentioned shoulder and an annular surface section surrounding the through-hole, through which the guide rod protrudes. In this case, the annular section faces away from the cover plate and is structurally fixed to the actuation element. The resilient element may comprise a certain pretension. It urges the shoulder, i.e. the second end of the guide rod, inwards, such that the cover plate is continuously pulled towards the actuation element. When the sealing device according to the invention is mounted to the wing, the cover plate is thus continuously urged into the aperture.

In an advantageous embodiment, the guide element comprises a retainer at a distance to both the first end and the second end, wherein the retainer radially protrudes from the guide element. The movability of the cover plate is strictly reduced by the retainer, since the retainer of the guide element acts as an end stop to prevent further movement of the guide element through the through-hole mentioned above or any other suitable feature. Also, the retainer ensures that a sufficient pretension remains to prevent a flutter motion of the cover plate.

In an advantageous embodiment, the second end comprises a removable head portion, wherein the shoulder is arranged on the head portion. By designing the head portion to be removable a simple installation and adjustment of the sealing device is possible.

In an advantageous embodiment, the sealing device further comprises at least one bracket attachable to the actuation element, wherein the at least one bracket comprises at least one through-hole for receiving a part of the at least one holding device. The bracket allows to simply mount the sealing device to the actuation element. Often, the actuation elements in an aircraft comprise slightly different shapes or dimensions depending on their spanwise positions. Instead of modification of the actuation elements, individual brackets may be made to conform the various shapes and install the sealing device to the individual actuation elements in a simple manner.

In an advantageous embodiment, the at least one bracket is arranged substantially parallel to the cover plate at least in a region. The cover plate may thus move in a direction perpendicular to both the cover plate and the at least one bracket, which simplifies guiding of the cover plate.

In an advantageous embodiment, the at least one bracket has a holding portion and an attachment portion arranged at an angle to each other, wherein the holding portion is designed for coupling with the at least one holding device. The holding portion may thus protrude away from the attachment portion, which in turn is designed to conform the individual shape and design of the respective actuation element.

In an advantageous embodiment, the at least one holding portion is arranged substantially parallel to the cover plate and substantially comprises an L-shape, wherein the attachment portion is arranged substantially perpendicular to the holding portion.

In an advantageous embodiment, the through-hole has a larger diameter than the respective part of the at least one holding device received by the respective through-hole. This allows the cover plate to slightly move in a lateral direction during its alignment.

In an advantageous embodiment, the sealing device further comprises a separate aligning bracket that is attachable to the wing part to surround the respective aperture, wherein the aligning bracket has an opening with a chamfered opening edge complementary to the cover plate edge. Thus, the aperture does not necessarily comprise the chamfered edge itself and its manufacturing is simplified. The aligning bracket as a separate part may be made in a separate manufacturing process, e.g. by cutting, milling, injection molding or any other suitable process. In total, the manufacturing effort and thus costs may be reduced. The alignment bracket may be placed on an interior side of the wing part.

The invention further relates to a wing of an aircraft, comprising a fixed wing, at least one device movable relative to the fixed wing, and at least one sealing device according to any of the preceding claims, wherein the fixed wing comprises at least one aperture for an actuation element that is coupled to the at least one device, and wherein the at least one sealing device is arranged at the fixed wing to cover at least a part of the respective aperture. The sealing device is arranged inside the fixed wing, such that the at least one holding device is installed on the actuation element, the cover plate reaches into the respective aperture and the outer surface is flush with the surrounding outer wing surface with the device being retracted. The device may be a control surface, such as a slat, a droop nose, or a spoiler. Also, the device may refer to any other movable device that requires an aperture in the wing part that is to be covered by the sealing device.

In an advantageous embodiment, the actuation element is a curved track, which is coupled with an actuator for being selectively extended out of and retracted into the fixed wing, and wherein the device is a control surface in form of a leading-edge slat. For example, the motion path for the track has a curvature that coincides with the curvature of the track. The track may be realized in the form of a so-called "short curved track".

Of course, the sealing device according to the invention may also be suitable for apertures associated with other control surfaces, kinematics or any device that requires an aperture that can be covered. For example, the sealing device may be applicable to droop noses, telescopic ducts, power transfer assemblies, spoilers, and other specific actuation covers.

In an advantageous embodiment, the actuation element has a flange protruding away from the actuation element, wherein the sealing device, when referring to the above-mentioned embodiment with the at least one bracket, comprises two brackets that are designed to be mirror-inverted, wherein the attachment portions are attached to two opposite side surfaces, and wherein the holding portions span a common plane, substantially parallel to which the cover plate is arranged.

Lastly, the invention further relates to an aircraft comprising at least one wing according to the above and/or at least one sealing device according to the above. The aircraft may be a commercial aircraft, i.e., a passenger aircraft and in particular a large passenger aircraft with at least 100 seats.

BRIEF DESCRIPTION OF THE FIGURES

In the following, the attached drawings are used to illustrate exemplary embodiments in more detail. The illustrations are schematic and not to scale. Identical reference numerals refer to identical or similar elements. They show.

DETAILED DESCRIPTION OF THE PREFERRED EMBODIMENTS

Figure 1:
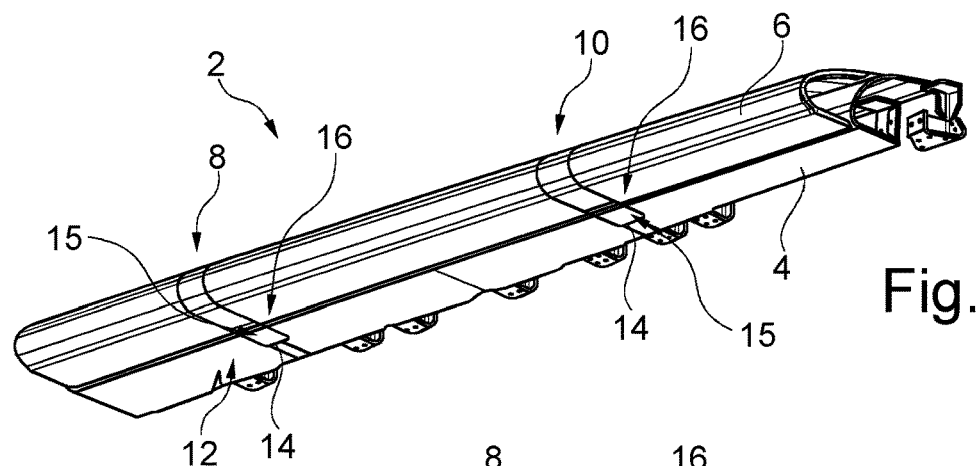
FIG. 1 shows a wing in a schematic, three-dimensional view.

FIG. 1 shows a part of a wing 2 having a fixed wing 4 and a movable control surface 6 in the form of a leading-edge slat. Here, the slat 6 is supported by a first support station 8 and a second support station 10, wherein in each of the stations 8 and 10, an actuation element, such as a curved track, is provided. The actuation element is movable relative to the fixed wing 4 and coupled with the slat through lugs, knuckles, joints, or any other suitable devices.

For example, the first station 8 is a so-called master support station and the second station 10 is a so-called slave support station. At a bottom side 12 of the fixed wing 4, apertures 14 are provided, through which the respective actuation element protrudes from inside the fixed wing 4 to the outside if the control surface 6 is extended. The apertures 14 are covered by a sealing device 16, which is explained in further detail below.

Figure 2:
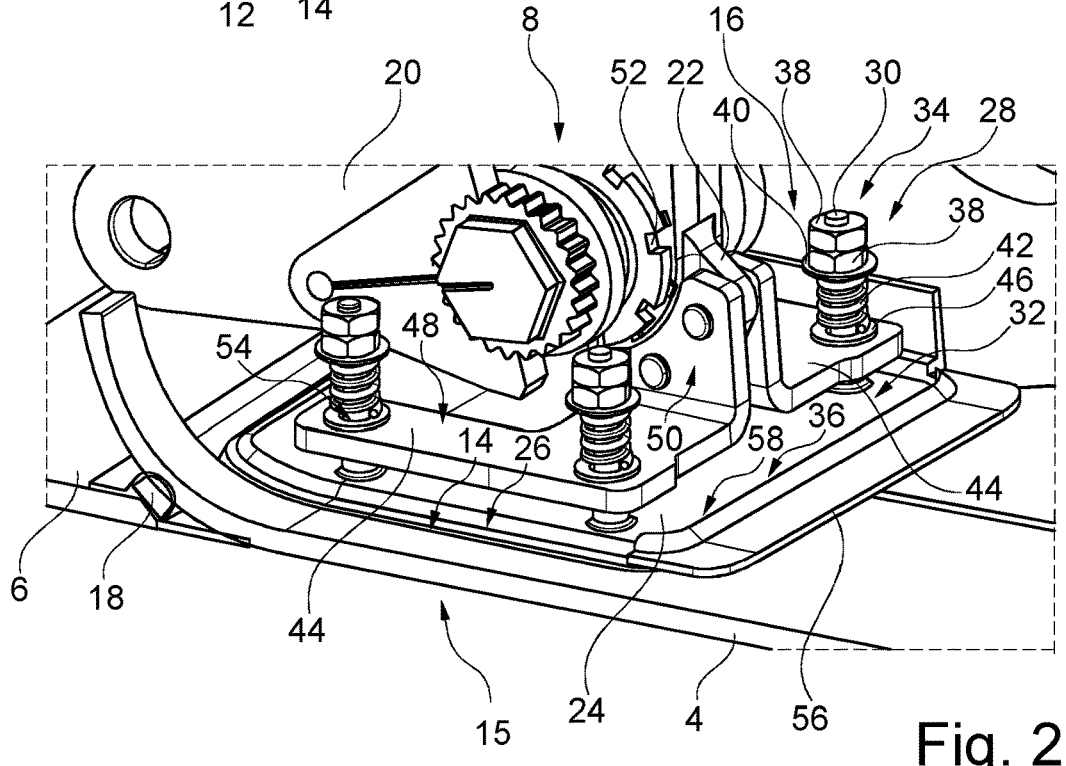
FIG. 2 shows a sealing device arranged at a master support station in a schematic, three-dimensional view.

FIG. 2 shows the sealing device 16 arranged at the master support station 8 in a schematic, three-dimensional view. Here, a forward part of the fixed wing 4 is illustrated, which is often referred to as "D nose". In this illustration, the control surface 6 is directly arranged in front of the D nose in a retracted position. A slat seal 18, i.e. a lower heel seal, is clamped between the control surface 6 and the fixed wing 4. The seal 18 may extend along the complete spanwise extension of the control surface 6. An actuation element 20 is shown, which is couplable with the control surface 6. It comprises a flange 22 for coupling with the sealing device 16.

The sealing device 16 comprises a cover plate 24 covering at least the part of the aperture 14. The cover plate 24 has an outer surface 15, which is visible e.g. in FIG. 1, and which is delimited by a cover plate edge 26. A plurality of holding devices 28 is provided, that each comprise a guiding rod 30 as a guide element with a first end 32 and a second end 34. The first end 32 is connected to an inner surface 36 of the cover plate 24, such that the cover plate 24 cannot move relative to the guide rod 30.

At the second end 34 of the guide rod 30, two nuts 38 are provided, which exemplarily hold a first washer 40 that provides a shoulder for a spring 42 as a resilient element. The spring 42 in turn is arranged between the first washer 40 and a bracket 44. One end of the spring 42 is in contact with the first washer 40, while the other end is in contact with a second washer 46. The spring 42 is pretensioned, such that it continuously urges the nuts 38 inwards. As the cover plate 24 is attached to the guide rod 30, it is constantly urged inwards, too. In this exemplary embodiment, altogether four holding devices 28 are present, which are distributed symmetrically on the inner surface 36 of the cover plate 24 and are coupled with two mirror-inverted brackets 44.

Both brackets 44 comprise a holding portion 48 and an attachment portion 50. The attachment portion 50 is substantially perpendicular to the holding portion 48 and is connected to the flange 22. Both attachment portions 50 enclose the flange 22 and may be connected to each other through fastening elements 52, such as rivets or bolts. The holding portions 48 comprise an L shape, in which through-holes 54 for passing the guide rods 30 through. Thus, the cover plate 24 always follows the motion of the actuation element 20, when extending or retracting the control surface 6.

When in the retracted position, the cover plate 24 is urged into the aperture 14. The cover plate edge 26 is chamfered, such that the cover plate 24 aligns relative to an alignment bracket 56, which has a complimentary shaped opening edge 58. Independently from load- and temperature-induced elastic deformation of the actuation element 20, the cover plate 24 may always remain inside the aperture 14 and a certain position compensation between the cover plate 24 and the actuation element 20 perpendicular to the inner surface 36 is possible. When providing the through-holes 54, they may be made slightly larger than the cross-section of the guide rods 30, such that a slight lateral position compensation is possible, too.

Figure 3:
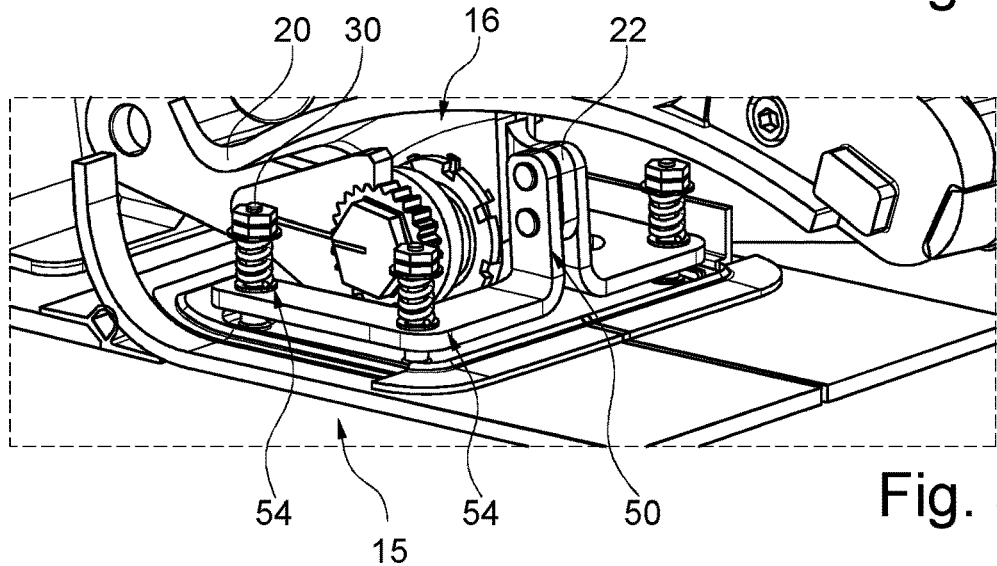
FIG. 3 shows another embodiment of a sealing device arranged at the master support station 8 in a schematic, three-dimensional view.

In FIG. 3, the sealing device 16 from the slave support station 10 is shown. This embodiment hardly differs from the embodiment shown in FIG. 2. Here, exemplarily only the attachment portions 50 as well as the flange 22 are designed slightly differently, as well as the actuation element 20. However, the through-holes 54 are distinctly larger than the cross-section of the guide rods 30. This allows an increased lateral compensation of the position of the cover plate 24 since a greater movement of the slave support station 10 in comparison with the master support station 8 is to be expected.

Figure 4:
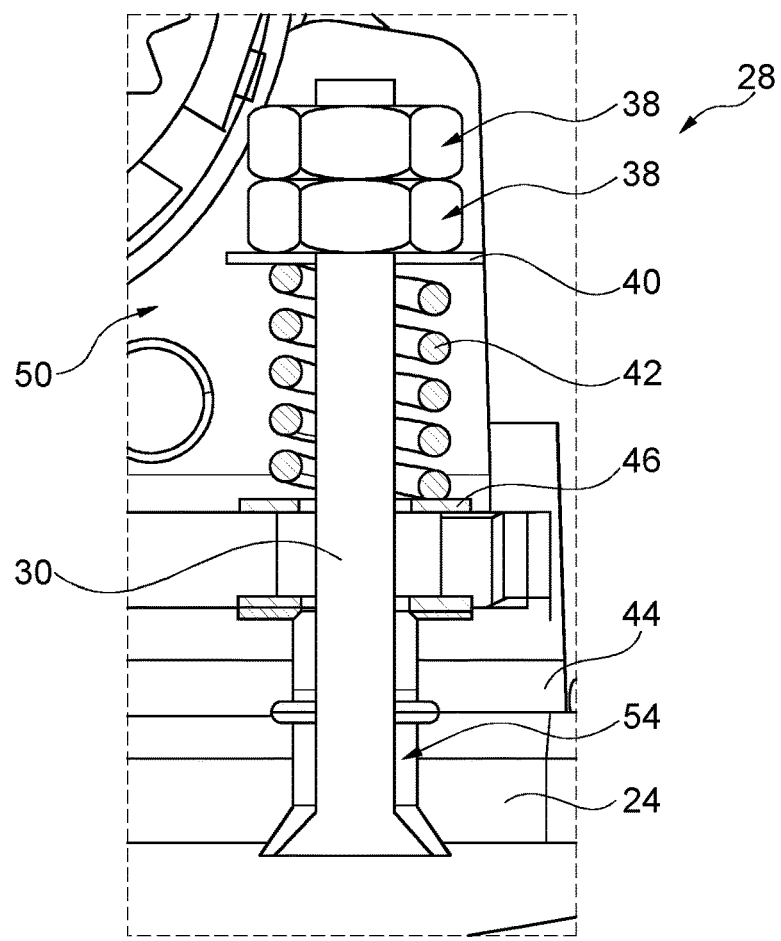
FIG. 4 shows a side, cutaway view of a holding device according to one or more embodiments.

FIG. 4 shows a detail of holding device 28. Here, an extended position of the actuation element 20 is shown. The cover plate 24 is placed as near to the bracket 44 as possible, since the actuation element 20 is extended away from the aperture 14 and thus, the cover plate 24 is not urged to the edge of the aperture 14 or the aligning bracket 56. Furthermore, the size of the through hole 54 in comparison to the guide rod 30 is demonstrated.

Figure 5:
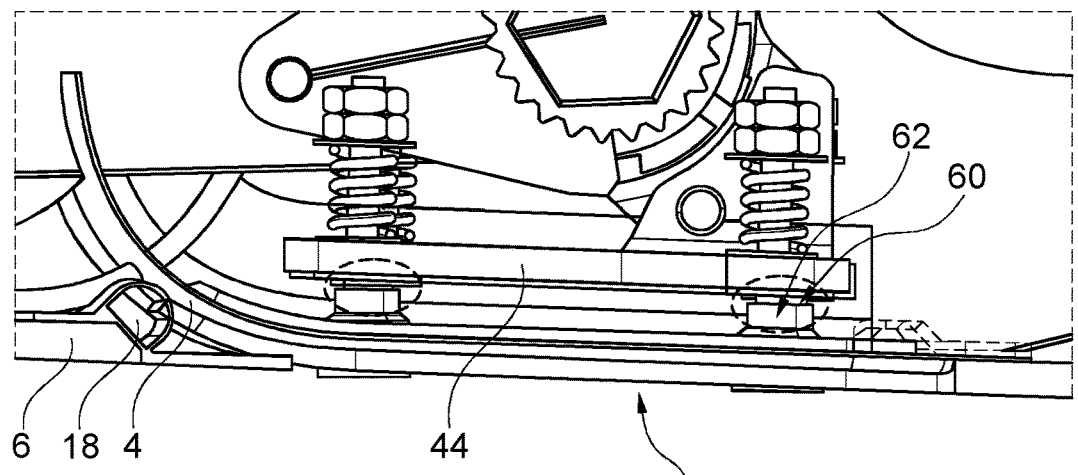
FIG. 5 shows a cover plate in a retracted position according to one or more embodiments.

In FIG. 5, exemplarily a retracted position is shown, where the cover plate 24 is urged into the aperture 14, such that a gap 60 between the cover plate 24 and a retainer 62 of the guide rod 30 is provided. The retainer 62 is realized as shoulder or a radial stop that prevents an excessive motion of the cover plate 24 to the bracket 44.

Figure 6:
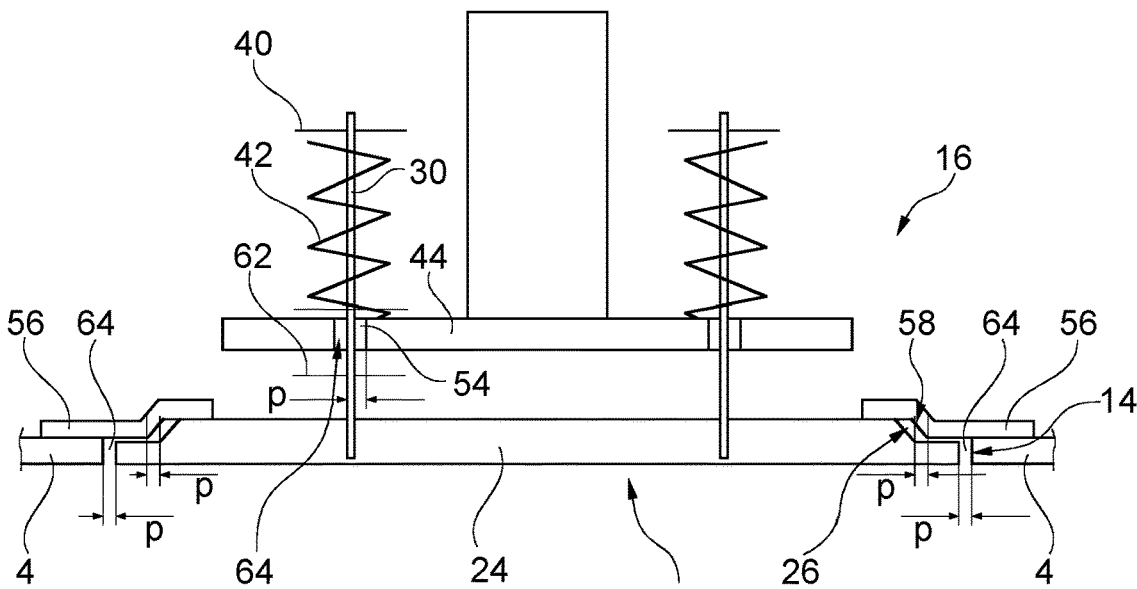
FIG. 6 shows a schematic view of a sealing device according to one or more embodiments.

FIG. 6 shows a very schematic functional illustration of the sealing device 16. Here, the retainer 62, the spring 42 and the first washer 40 are shown. The spring 42 is arranged between the bracket 44 and the first washer 40 and urges the shoulder away from the bracket 44, thereby pulling the cover plate 24 towards the bracket 44. The retainer 62 prevents an excessive motion and provides an end stop.

The self-aligning brackets 56 are further shown and are exemplarily attached to an inner side of the fixed wing 4. Here, lateral gaps 64 are arranged between the cover plates 24 and a contour of the aperture 14 as well as between the chamfered edges 26 and 58. Furthermore, the through-hole 54 is dimensioned to exceed the diameter of the guide rod 30, such that lateral gaps 64 are created there as well. While a relatively far motion perpendicularly to the cover plate 24 is possible, only a slight motion in the lateral direction, i.e. parallel to the extension plane of the cover plate 24, is possible.

The illustration in FIG. 6 shows that the tolerance chain to improve the aerodynamic flushness is easy to control, as it involves the material thicknesses of the wing part and the cover plate 24 as well as the joggle features only, but not the kinematics or the drive system for the actuation element 20.

Figure 7:
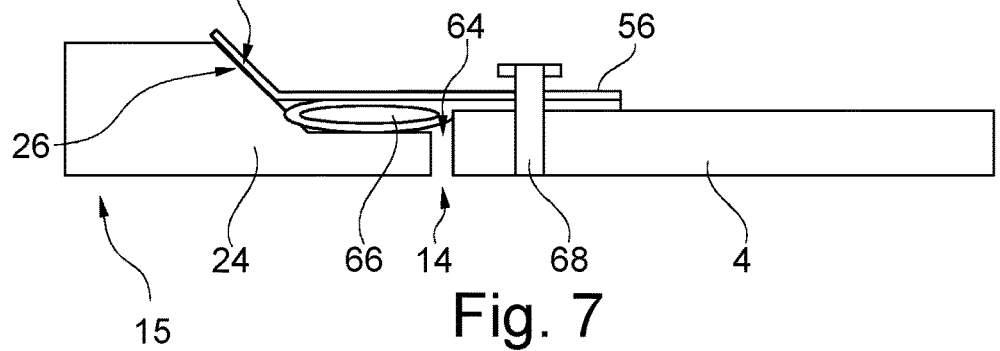
FIG. 7 is a side schematic view of a wing according to one or more embodiments.

In FIG. 7, exemplarily a seal 66 is attached to the fixed wing 4 in the region of the aperture 14, e.g. by clamping the aligning bracket 56 onto the seal 66. The gap 64 is reliably used. Fastening the self-aligning bracket 56 is conducted by a rivet 68 or another fastening element.

Figure 8:
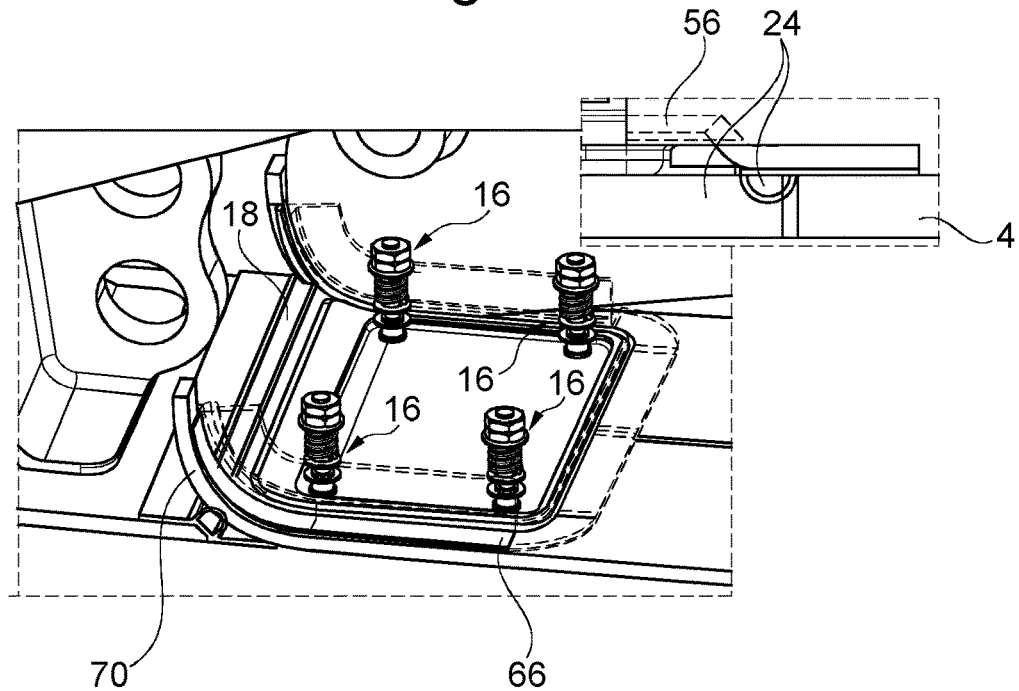
FIG. 8 shows a seal in association with a cover plate according to one or more embodiments.
Figure 9:
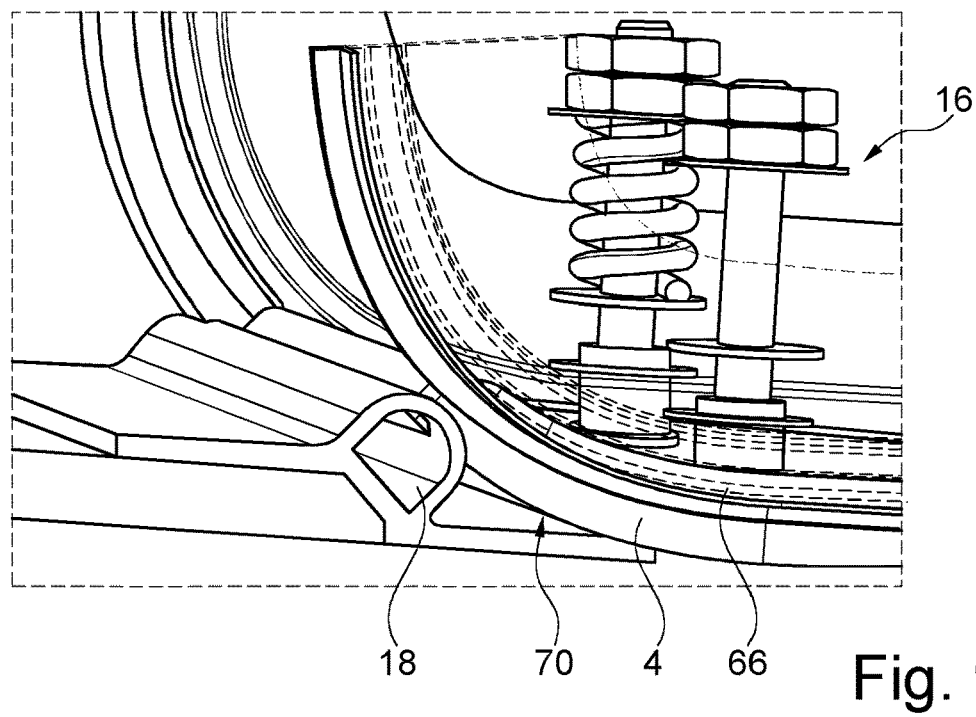
FIG. 9 shows a seal in association with a cover plate according to one or more embodiments.
Figure 10:
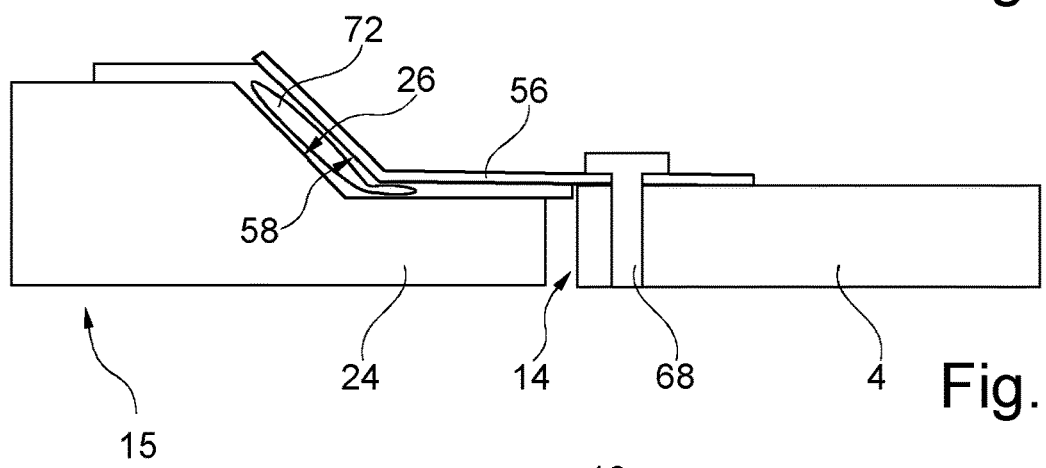
FIG. 10 is a side, schematic of another embodiment of a seal in association with a cover plate.
Figure 11:
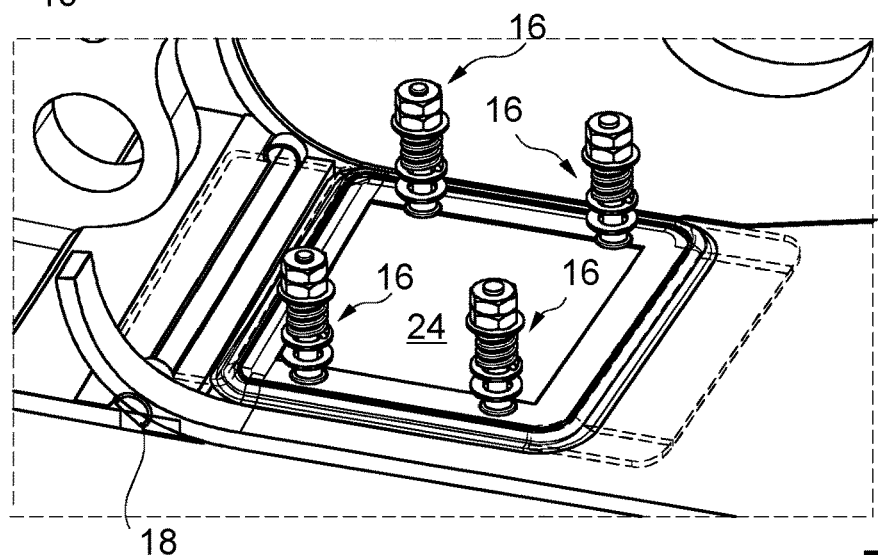
FIG. 11 is a top view of the seal of FIG. 10.
Figure 12:
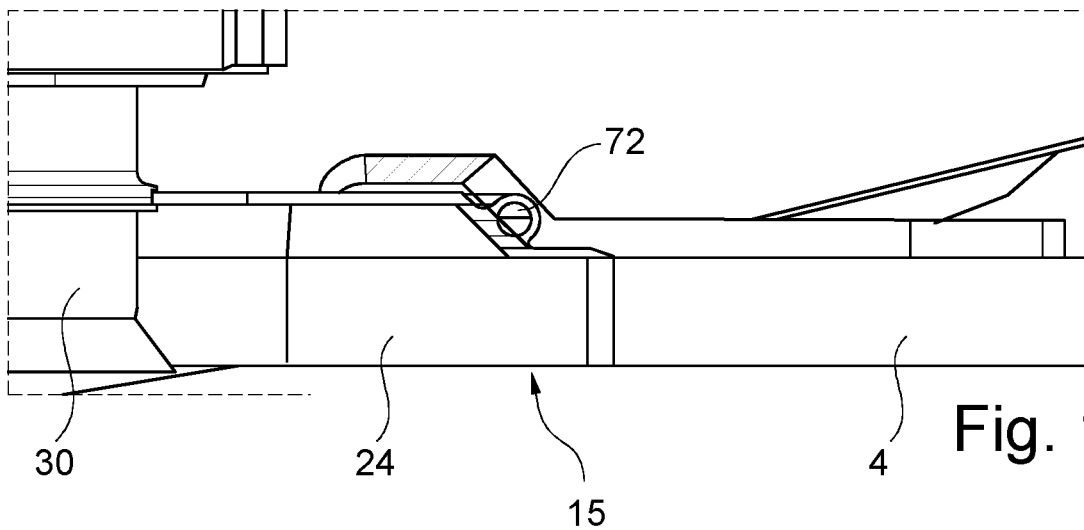
FIG. 12 is a side view of the seal of FIG. 10.
Figure 13:
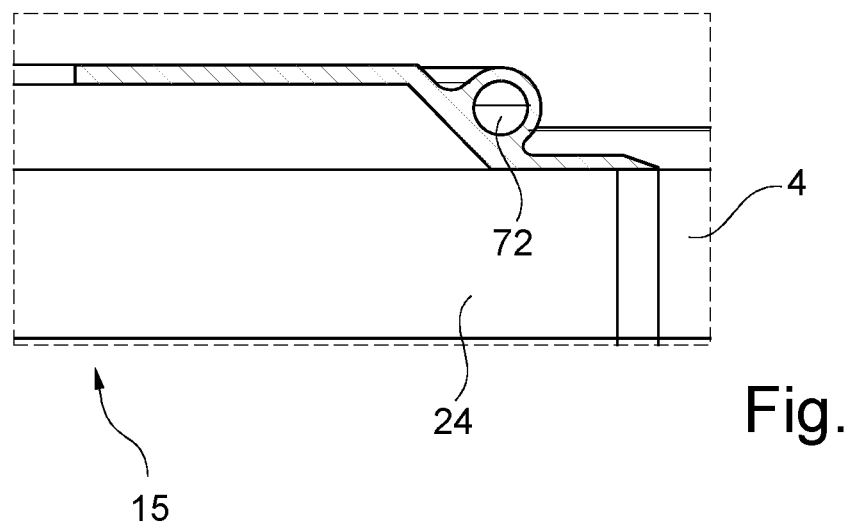
FIG. 13 is a close up, side view of the seal of FIG. 10.

FIGS. 8 and 9 show the seal 66 extending along the cover plate 24 and running along the D nose section 70.

As shown in FIG. 10 to 13, an alternative seal 72 is attached to the cover plate 24. Here, the seal 72 may circumferentially extend along the cover plate 24. It is pressed onto the self-aligning bracket 56 upon retracting the actuation element 20 and thus moving the cover plate 24 into the aperture 14. The chamfered edges 26 and 58 thus do not touch each other directly, but through the respective seal. By pressing the seal 72, a pressure-tight seal around the cover plate 24 may be provided. This may be beneficial for preventing leakage flow, reducing parasitic drag, and improving fire protection.

Figure 14:
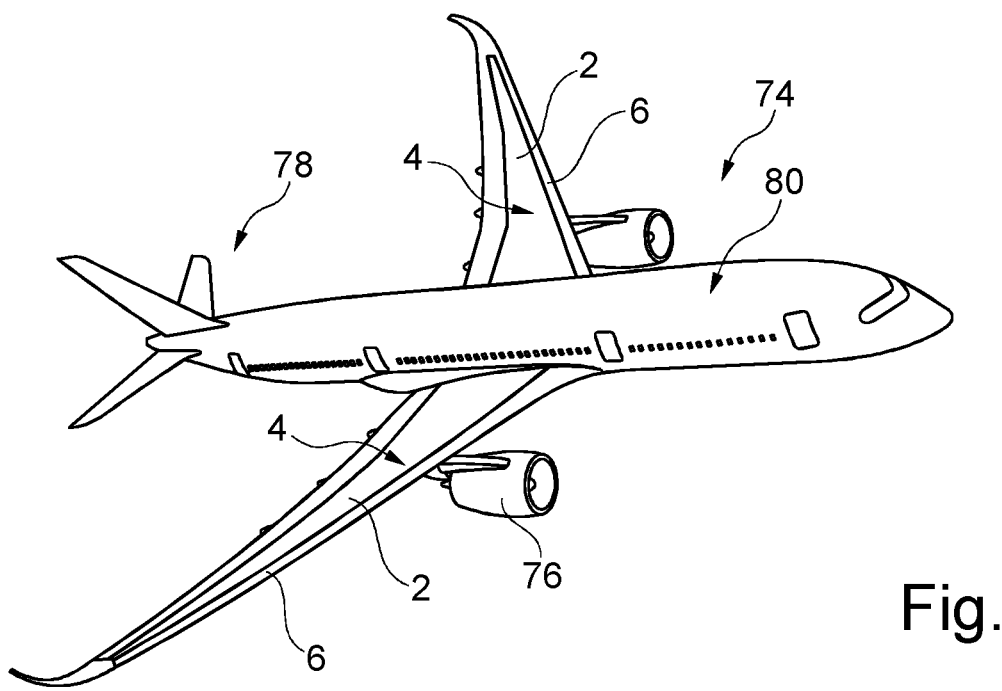
FIG. 14 shows an aircraft according one or more embodiments.

Lastly, FIG. 14 shows an aircraft 74 having wings 2, engines 76, a tail plane 78 and a fuselage 80. Here, the control surfaces 6 arranged at the leading edge of the wings 2 may be movable by extending the respective actuation elements 20 from inside the fixed wings 4 through apertures 14 to the outside. The apertures 14 are at least partially sealed by the above-described sealing device 16.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 wing
4 fixed wing
6 slat/control surface
8 first support station
10 second support station
12 bottom side
14 aperture
15 outer surface
16 sealing device
18 slat seal
20 actuation element
22 flange
24 cover plate
26 cover plate edge
28 holding device
30 guiding rod/guide element
32 first end
34 second end
36 inner surface
38 nut/head portion
40 first washer/shoulder
42 resilient element/spring
44 bracket
46 second washer
48 holding portion
50 attachment portion
52 fastening element
54 through-hole
56 alignment bracket
58 opening edge
60 gap
62 retainer
64 lateral gap
66 seal
68 rivet
70 D nose section
72 seal
74 aircraft
76 engine
78 tail plane
80 fuselage

The invention claimed is:

1. A sealing device for covering an aperture in a wing part of an aircraft, the sealing device comprising:
a cover plate for covering at least a part of an aperture, the cover plate having an outer surface delimited by a cover plate edge, and
at least one holding device coupled with the cover plate,
wherein the at least one holding device comprises a resilient element,
wherein the at least one holding device is configured to resiliently hold the cover plate at a distance to an actuation element, wherein the distance is variable in a first direction substantially perpendicular to the outer surface,
wherein the at least one holding device is configured to hold the cover plate in a substantially fixed spatial alignment in a second direction perpendicular to the first direction, and
wherein the resilient element is designed for urging the cover plate towards the actuation element in a mounted state of the sealing device,
wherein the at least one holding device comprises a guide element with a first end and an opposite second end,
wherein the first end is attached to the cover plate,
wherein the resilient element is arranged on the guide element and contacts a shoulder arranged on the second end,
wherein the guide element comprises a retainer at a distance to both the first end and the second end, and
wherein the retainer radially protrudes from the guide element.

2. The sealing device according to claim 1, wherein the cover plate edge is at least partially chamfered to align the cover plate in a complementary shaped delimiting edge of the aperture when the cover plate is placed in the aperture.

3. The sealing device according to claim 1,
wherein the second end comprises a removable head portion, and
wherein the shoulder is arranged on the head portion.

4. The sealing device according to claim 1, further comprising:
at least one bracket attachable to the actuation element,
wherein the at least one bracket comprises at least one through-hole for receiving a part of the at least one holding device.

5. The sealing device according to claim 4,
wherein the at least one bracket is arranged substantially parallel to the cover plate at least in a region.

6. The sealing device according to claim 4,
wherein the at least one bracket has a holding portion and an attachment portion arranged at an angle to each other,
wherein the holding portion is designed for coupling with the at least one holding device.

7. The sealing device according to claim 6,
wherein the at least one holding portion is arranged substantially parallel to the cover plate and substantially comprises an L-shape, and
wherein the attachment portion is arranged substantially perpendicular to the holding portion.

8. The sealing device according to claim 4,
wherein the through-hole has a larger diameter than the respective part of the at least one holding device received by the respective through-hole.

9. The sealing device according to claim 1, further comprising:
a separate aligning bracket that is attachable to the wing part to surround the respective aperture, and
wherein the aligning bracket has an opening with a chamfered opening edge complementary to the cover plate edge.

10. A wing of an aircraft, comprising:
a fixed wing,
at least one device movable relative to the fixed wing, and
the sealing device according to claim 1,
wherein the fixed wing comprises at least one aperture for an actuation element that is coupled to the at least one device, and
wherein the at least one sealing device is arranged at the fixed wing to cover at least a part of the respective aperture.

11. The wing according to claim 10,
wherein the actuation element is a curved track, which is coupled with an actuator for being selectively extended out of and retracted into the fixed wing, and
wherein the at least one device is a control surface in the form of a leading-edge slat.

12. The wing according to claim 10,
wherein the actuation element has a flange protruding away from the actuation element,
wherein the sealing device, when referring to claim 8, comprises two brackets that are designed to be mirror-inverted,
wherein attachment portions of the two brackets are attached to two opposite side surfaces, and
wherein holding portions of the two brackets span a common plane, substantially parallel to which the cover plate is arranged.

13. An aircraft comprising:
the wing according to claim 10.

14. A sealing device for covering an aperture in a wing part of an aircraft, the sealing device comprising:
a cover plate for covering at least a part of an aperture, the cover plate having an outer surface delimited by a cover plate edge, and
at least one holding device coupled with the cover plate,
wherein the at least one holding device comprises a resilient element,
wherein the at least one holding device is configured to resiliently hold the cover plate at a distance to an actuation element, wherein the distance is variable in a first direction substantially perpendicular to the outer surface,
wherein the at least one holding device is configured to hold the cover plate in a substantially fixed spatial alignment in a second direction perpendicular to the first direction, and
wherein the resilient element is designed for urging the cover plate towards the actuation element in a mounted state of the sealing device,
wherein the at least one holding device comprises a guide element with a first end and an opposite second end,
wherein the first end is attached to the cover plate,
wherein the resilient element is arranged on the guide element and contacts a shoulder arranged on the second end,
wherein the second end comprises a removable head portion, and
wherein the shoulder is arranged on the head portion.

15. A sealing device for covering an aperture in a wing part of an aircraft, the sealing device comprising:
a cover plate for covering at least a part of an aperture, the cover plate having an outer surface delimited by a cover plate edge,
at least one holding device coupled with the cover plate,
wherein the at least one holding device comprises a resilient element,
wherein the at least one holding device is configured to resiliently hold the cover plate at a distance to an actuation element, wherein the distance is variable in a first direction substantially perpendicular to the outer surface,
wherein the at least one holding device is configured to hold the cover plate in a substantially fixed spatial alignment in a second direction perpendicular to the first direction, and
wherein the resilient element is designed for urging the cover plate towards the actuation element in a mounted state of the sealing device, and
at least one bracket attachable to the actuation element,
wherein the at least one bracket comprises at least one through-hole for receiving a part of the at least one holding device
wherein the at least one bracket has a holding portion and an attachment portion arranged at an angle to each other,
wherein the holding portion is designed for coupling with the at least one holding device
wherein the at least one holding portion is arranged substantially parallel to the cover plate and substantially comprises an L-shape, and
wherein the attachment portion is arranged substantially perpendicular to the holding portion.

\* \* \* \* \*